United States Patent
Geiger et al.

(10) Patent No.: US 10,352,764 B2
(45) Date of Patent: Jul. 16, 2019

(54) CONCEALED OPTOELECTRONIC MODULE

(71) Applicant: ams Sensors Singapore Pte. Ltd., Singapore (SG)

(72) Inventors: Jens Geiger, Thalwil (CH); Frank Sobel, Rixheim (FR); Rene Kromhof, Wollerau (CH); Alberto Soppelsa, Adliswil (CH); Kevin Hauser, Mühlehorn (CH); Robert Lenart, Zurich (CH)

(73) Assignee: ams Sensors Singapore Pte. Ltd., Singapore (SG)

( * ) Notice: Subject to any disclaimer, the term of this patent is extended or adjusted under 35 U.S.C. 154(b) by 159 days.

(21) Appl. No.: 15/274,055

(22) Filed: Sep. 23, 2016

(65) Prior Publication Data
US 2017/0089757 A1    Mar. 30, 2017

Related U.S. Application Data

(60) Provisional application No. 62/232,241, filed on Sep. 24, 2015.

(51) Int. Cl.
| G01J 1/02 | (2006.01) |
| G01J 1/04 | (2006.01) |
| G01J 1/06 | (2006.01) |
| G01J 1/08 | (2006.01) |

(52) U.S. Cl.
CPC ........... *G01J 1/0295* (2013.01); *G01J 1/0204* (2013.01); *G01J 1/0266* (2013.01); *G01J 1/0271* (2013.01); *G01J 1/0437* (2013.01); *G01J 1/0474* (2013.01); *G01J 1/06* (2013.01); *G01J 1/08* (2013.01); *G01J 2001/061* (2013.01)

(58) Field of Classification Search
CPC .... H01L 25/167; G01S 17/026; G01S 7/4811; G01J 1/0271; G01J 1/06
See application file for complete search history.

(56) References Cited

U.S. PATENT DOCUMENTS

| 9,094,593 | B2 | 7/2015 | Rudmann et al. |
| 2014/0021491 | A1* | 1/2014 | Meng ...................... H01L 33/54 257/82 |
| 2015/0226839 | A1* | 8/2015 | Brandl .................. H01L 25/167 250/221 |
| 2016/0072029 | A1 | 3/2016 | Geiger et al. |
| 2016/0091777 | A1 | 3/2016 | Kuan et al. |
| 2016/0138944 | A1* | 5/2016 | Lee ........................ G01S 17/026 250/227.11 |

FOREIGN PATENT DOCUMENTS

WO    WO 2015/160309    10/2015

* cited by examiner

*Primary Examiner* — Thanh Luu
(74) *Attorney, Agent, or Firm* — Fish & Richardson P.C.

(57) ABSTRACT

An optoelectronic module that includes a reflectance member which exhibits mitigated or eliminated fan-out field-of-view overlap can be concealed or its visual impact minimized compared to a host device in which the optoelectronic module is mounted. In some instances, the reflectance member can be implemented as a plurality of through holes and in other instances the reflectance member may be a contiguous spin-coated polymeric coating. In general, the reflectance member can be diffusively reflective to the same particular wavelengths or ranges of wavelengths as the host device in which it is mounted.

22 Claims, 9 Drawing Sheets

CONCEALED OPTOELECTRONIC MODULE

TECHNICAL FIELD

This disclosure relates to optoelectronic modules that send and/or receive light.

BACKGROUND

The present disclosure relates generally to methods and apparatus for concealing optoelectronic modules and other components that require transmission of light in the visible and near-visible spectrums. A few examples of such optoelectronic modules include cameras, infrared sensors, ambient light sensors, and indicator lights. Such modules can be used for proximity detection, ambient light sensing, 2D imaging, 3D imaging, light projecting, and light sensing applications. In some instances, such optoelectronic modules may be mounted adjacent a display in a host device such as handheld devices (e.g., smartphones, tablet computers, laptops, and augmented-reality devices), electrical appliances (e.g., kitchen appliances, smart light switches, televisions and phones), and automobiles (e.g., passenger vehicles, heavy duty and light duty vehicles). In some instances, such optoelectronic modules may be mounted in a visually obtrusive area of a host device (e.g., the dashboard of a passenger vehicle, or the case of a smartphone). In some instances, it is desired that the optoelectronic module is not visible due a particular intrinsic functionality of the electronic device in which it is incorporated; for example, an electronic device intended to covertly monitor a subject. Accordingly, in many cases, a better design could be achieved if the location of these components could be at least partially concealed from view. Concealment is challenging, however, because the passage of light through any intervening structure or surface is necessary for proper functioning of the optoelectronic modules. State-of-the-art concealing structures designed to overcome this challenge may not be suitable for an intend application, and may be relatively complex and expensive to produce. Further, concealing structures may also produce a substantial fan-out field-of-view overlap of the emitting and receiving channels of many optoelectronic modules. Fan-out field-of-view overlap can significantly reduce performance of optoelectronic modules.

Further, fan-out field-of-view overlap due to concealing structures can pose even more of a challenge to optoelectronic modules incorporated into (concealed within) white or near-white host devices. Materials that appear white or near-white (i.e., materials with reflectance characteristics that appear white to an observer) may be non-transmissive to, or may substantially attenuate, both visible and invisible regions of the electromagnetic spectrum. Consequently, optoelectronic modules concealed by materials that appears white or near-white may exhibit significant fan-out field-of-view overlap.

SUMMARY

The present disclosure describes techniques and apparatuses that conceal or minimize the visual impact of an optoelectronic module mounted within a host device; that is, the techniques and apparatuses are designed to limit the visual distinction of an optoelectronic module in comparison to the surrounding portions of the host device. Further, implementations exhibit mitigated or eliminated fan-out field-of-view overlap.

In one aspect, for example, an optoelectronic module includes an emitter and a detector electrically mounted to a substrate. The emitter is operable to generate emitted light of a particular wavelength or range of wavelengths and the detector is operable to detect the particular wavelength or range of wavelengths generated by the emitter. The optoelectronic module further includes a spacer disposed between the emitter and the detector, and an optoelectronic module cover including an optoelectronic module cover surface. The optoelectronic module cover is substantially transmissive to the emitted light. The optoelectronic module further includes a reflectance member mounted to the optoelectronic module cover surface. The reflectance member is both transmissive and diffusively reflective to the particular wavelengths or ranges of wavelengths generated by the emitter and detectable by the detector such that the optoelectronic module exhibits substantially no fan-out FOV overlap.

Various implementations can include one or more of the following features. For example, some implementations include a spacer that is substantially non-transmissive to the particular wavelength or range of wavelengths of light generated by an emitter and detectable by a detector.

Some implementations include a spacer having a non-transmissive core. The non-transmissive core is substantially non-transmissive to the particular wavelength or range of wavelengths of light generated by an emitter and detectable by a detector.

Some implementations include a baffle mounted to an optoelectronic module cover or a spectral reflectance member.

Some implementations include a baffle that is substantially non-transmissive to a particular wavelength or range of wavelengths of light generated by an emitter and detectable by a detector.

Some implementations include an optoelectronic module cover including a non-transmissive cover core. The non-transmissive cover core is substantially non-transmissive to a particular wavelength or range of wavelengths of light generated by an emitter and detectable by detector.

Some implementations include a reflectance member with a plurality of holes.

Some implementations include a reflectance member with a plurality of holes, where the plurality of holes extends over 30% to 50% of the reflectance member surface.

Some implementations include a reflectance member with a plurality of holes, where the average diameter of an individual hole within the plurality of holes is between 20 microns and 100 microns.

Some implementations include a reflectance member with a plurality of holes, where the plurality of holes extends over 40% of the reflectance member surface, and the average diameter of an individual hole within the plurality of holes is 40 microns.

Some implementations include a reflectance member with a plurality of holes, wherein the plurality of holes is filled with a filler material, wherein the filler material is transmissive and diffusively reflective to a particular wavelength or ranges of wavelengths different from a reflectance member.

Some implementations include a reflectance member with a plurality of holes, wherein the plurality of holes are through holes.

Some implementations include an optoelectronic module that is mounted into a host device. The host device includes a host device case where the host device case is diffusively reflective to the same particular wavelength or range of wavelengths as the reflectance member.

Some implementations include an optoelectronic module with a spacer where the spacer is diffusively reflective to the same particular wavelength or range of wavelengths as the host device.

Some implementations include an optoelectronic module where a spacer includes a non-transmissive spacer core. The non-transmissive spacer core is substantially non-transmissive to the particular wavelength or range of wavelengths of light generated by an emitter and detectable by a detector.

Some implementations include an optoelectronic module where a baffle mounted to an optoelectronic module cover or a spectral reflectance member. The baffle is substantially non-transmissive to a particular wavelength or range of wavelengths of light generated by an emitter and detectable by a detector. The baffle is diffusively reflective to the same particular wavelength or range of wavelengths as a host device.

Some implementations include an optoelectronic module with an optoelectronic module cover. The optoelectronic module cover includes a non-transmissive cover core wherein the non-transmissive cover core is substantially non-transmissive to a particular wavelength or range of wavelengths of light generated by an emitter and detectable by a detector, and wherein the non-transmissive cover core is diffusively reflective to the same particular wavelength or range of wavelengths as a host device.

Some implementations include an optoelectronic module with a reflectance member. The reflectance member includes a plurality of holes, and the portion of the reflectance member surrounding each hole within the plurality of holes is diffusively reflective to the same particular wavelength or range of wavelengths as a host device.

Some implementations include an optoelectronic module mounted into a host device. The host device includes a host device case. The host device case is diffusively reflective to the same particular wavelength or range of wavelengths as a reflectance member. The host device further includes a host device transparent cover. The host device transparent cover is both transmissive and diffusively reflective to the particular wavelengths or ranges of wavelengths generated by an emitter and detectable by a detector. The host device transparent cover is diffusively reflective to the same particular wavelengths as the host device.

Some implementations include an optoelectronic module where the optoelectronic module is mounted into a host device. The host device includes a host device case where the host device case is diffusively reflective to the same particular wavelength or range of wavelengths as a reflectance member. The host device further includes a host device transparent cover and a host device reflectance member mounted to the host device transparent cover. The host device reflectance member is transmissive to the particular wavelengths or ranges of wavelengths generated by an emitter and detectable by a detector, and the host device reflectance member is diffusively reflective to the same particular wavelengths as the host device.

Other aspects, features and advantages will be readily apparent from the following detailed description, the accompanying drawings, and the claims.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural changes may be made without departing from the scope of the present invention. The following description of example embodiments is, therefore, not to be taken in a limiting sense, and the scope of the present invention is defined by the appended claims.

DETAILED DESCRIPTION

Figure 1A:
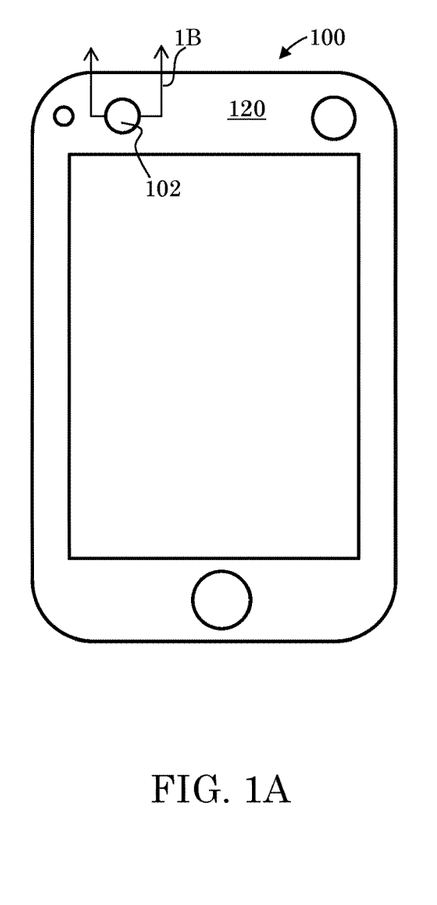
FIG. 1A depicts an example optoelectronic module mounted within a host device.
Figure 1B:
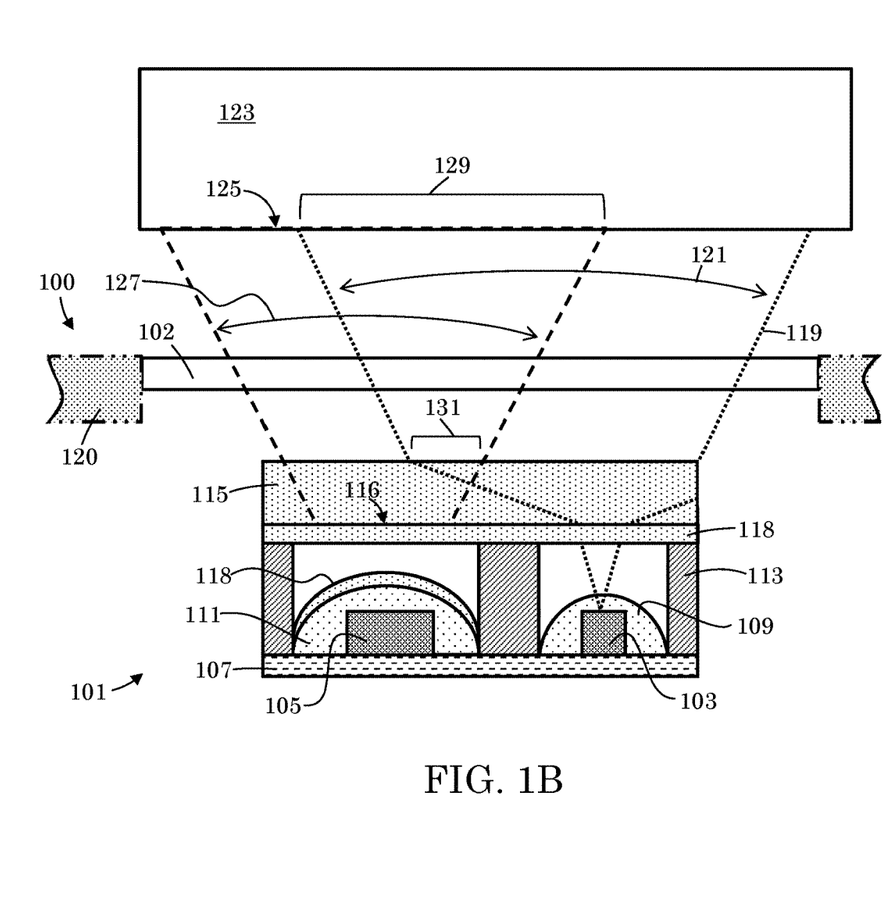
FIG. 1B depicts a cross-sectional view of a portion of the optoelectronic host device and the optoelectronic module depicted in FIG. 1A.

FIG. 1A depicts an example host device 100 in which an optoelectronic module 101 is mounted. The host device 100 can be any electronic device in which an optoelectronic module can be incorporated. For example, the host device 100 can be a smart phone or other mobile phone, a mobile computer (e.g., a laptop and/or tablet), an electronic device for displaying images (such as a television), or other electronic devices with suitable structural, computational, processing and/or power resources in which the optoelectronic device can be incorporated. A host device transparent cover 102 mounted within a host device case 120 is also shown in FIG. 1A. A cross-section line 1B is also depicted. A magnified, cross-sectional view of the portion of the host device 100 bisected by the cross-section line 1B is depicted in FIG. 1B FIG. 1B depicts an optoelectronic module 101 with the host device transparent cover 102 and host device case 120 depicted in FIG. 1A. The optoelectronic module 101 is mounted within the host device 100 as described above. The optoelectronic module 101 can be any one of a number of optoelectronic devices and can include any optoelectronic device that emits and detects any wavelength or range of wavelengths of electromagnetic radiation. For example, optoelectronic module 101 can be implemented as a proximity detector, a distance sensor, a camera, or another sensor. The optoelectronic module 101 in this, and the following illustrated examples, is depicted as a proximity detector for simplicity of the disclosure; however, other examples of optoelectronic modules are within the scope of this disclosure and the appended claims.

As mentioned above, the optoelectronic module 101 is mounted within the host device 100; further, in this example, the host device 100 includes a host device transparent cover 102 such as a glass or glass-like (e.g., polycarbonate) material, mounted within a host device case 120. In this example, the host device transparent cover 102 can be substantially transmissive to wavelengths of light within the visible and invisible portion of the electromagnetic spectrum (e.g., visible light and infrared light). Typically, the host device transparent cover 102 is substantially transmissive to wavelengths of light (e.g., infrared) generated by components within the optoelectronic module 101. The host device case 120 is substantially reflective to incident visible light, however. For example, the host device case 120 can be diffusively reflective to particular wavelengths of light and can appear white or near-white to an observer (e.g., a user of the host device). Moreover, the host device case 120 is typically non transmissive to infrared light.

The optoelectronic module 101 further includes an emitter 103 and a detector 105 electrically mounted to a substrate 107. The emitter 103 can be operable to generate emitted light 119. The emitted light 119 can be any wavelength or range of wavelengths of electromagnetic radiation. For example, the emitted light 119 can be light from the visible and/or invisible portion of the electromagnetic spectrum. The emitter 103 can be implemented as a light-emitting diode (LED), a laser diode, a vertical-cavity surface-emitting laser (VCSEL), or any combination and/or an array of any of the aforementioned. Further the emitter 103 can be operable to generate light that is in other ways non-visible to humans, e.g., light that is pulsed. Further, in some examples the emitter 103 can be operable to generate modulated light, e.g., suitable for time-of-flight distance measurements. In some examples, the detector 105 can be a photodiode, a complementary metal-oxide-semiconductor (CMOS) pixel, a charge-coupled device, or any combination and/or an array of any of the aforementioned. The detector 105 can be operable to measure intensity values of incident light, or can be operable to measure phase values of incident light, or can be operable to measure both intensity values and phase values.

The optoelectronic module 101 can further include an emitter optical element 109 functionally disposed with respect to the emitter 103; that is, disposed over and aligned with the emitter 103 so as to perform an optical function (e.g., projection) with a reasonable degree of optical performance. The emitter optical element 109 can be implemented as a refractive lens composed of an optical-grade polymeric material (e.g., acrylic, styrene, polycarbonate, cyclic-olefin polymers, cyclic-olefin copolymers, and polyester), although other types of optical elements are within the scope of this disclosure (e.g., a plurality of microlenses, a diffractive optical element, or an optical grating structure). Further, the optoelectronic module 101 can include a detector optical element 111 functionally disposed with respect to the detector 105; that is, disposed over and aligned with the detector 105 so as to perform an optical function (e.g., detection) with a reasonable degree of optical performance The detector optical element 111 can be implemented as a refractive lens composed of an optical-grade polymeric material (e.g., acrylic, styrene, polycarbonate, cyclic-olefin polymers, cyclic-olefin copolymers, and polyester), although other types of optical elements are within the scope of this disclosure (e.g., a plurality of microlenses, a diffractive optical element, or an optical grating structure).

The example depicted in FIG. 1B depicts the emitter optical element 109 and the detector optical element 111 as over-molded optical elements; however, in other examples the optical elements can be functionally disposed with respect to the emitter 103 and the detector 105, respectively, in a different way (e.g., via an interposed spacer that separates the emitter 103 and detector 105 from their respective optical elements). The emitter 103 in combination with the emitter optical element 109, can be operable to generate the emitted light 119 over an emitter field-of-view (FOV) 121. The detector 105 in combination with the detector optical element 111 can be operable to detect light over a detector FOV 127.

The optoelectronic module 101 further includes a spacer 113 on which the emitter optical element 109 and/or the detector optical element 111 can be mounted in some instances, though as depicted in FIG. 1B, the spacer 113 can be mounted to the substrate 107 and the emitter optical element 109 and the detector optical element 111 can also be mounted to the substrate 107. The spacer 113 can be composed of a polymeric material, a resin or other suitable material (e.g., materials that permit the spacer 113 to be manufactured via molding, injection molding, and/or vacuum injection molding techniques). Further, in this example, the spacer 113 is composed of a material operable to block, or at least substantially attenuate, wavelengths of light corresponding to the emitted light 119 such that the optoelectronic module can operate with reasonable performance. The spacer 113 can be composed of a material with organic fillers (e.g., carbon black) and/or inorganic fillers (e.g., silica). The optoelectronic module 101 further includes an optoelectronic module cover 115 mounted to the spacer 113, and can also include a spectral filter 118 mounted on a surface 116 of the optoelectronic module cover 115 or on one or both the emitter optical element 109 and the detector optical element 111. The spectral filters 118 can be implemented as a dielectric, a dye-filled polymer, or any other material suitable for filtering, substantially attenuating, or transmitting a certain wavelength or range of wavelengths of electromagnetic radiation as required by the intended function or application of the optoelectronic module 101.

The optoelectronic module cover 115 in the example illustrated in FIG. 1A and FIG. 1B is composed of a material such that it appears white or near-white to an observer of the host device 100. Consequently, since both the host device case 120 and the optoelectronic module cover 115 appear white or near-white to an observer, the optoelectronic module 101 is effectively concealed or its visual impact is minimized to an observer; that is, its visual distinction is limited in comparison to the surrounding portions of the host device 100. The performance of the optoelectronic module is severely compromised, however, as described below within the context of the typical operation of optoelectronic module 101.

In operation, the optoelectronic module 101 emits light 119 from the emitter 103 wherein the light can be incident on an object 123 (such as an observer or user of the host device 100). The object 123 can reflect light back to the optoelectronic module 101 from an object surface 125. When the optoelectronic module 101 is implemented as a proximity module, for example, the emitter FOV 121 and the detector FOV 127 should overlap on the object surface 125 in order to generate useful proximity data. This region is the region of FOV overlap 129 as illustrated in FIG. 1B.

As described above, when the optoelectronic module cover 115 is composed of a material that diffusively reflects light such that it appears white, other portions of the electromagnetic spectrum, such as the light generated by the emitter 103, can also be diffusively reflected by the same material. Accordingly, the emitted light 119 generated by the emitter 103 and incident on the optoelectronic module cover 115 can fan-out considerably within the optoelectronic module cover 115 as illustrated in FIG. 1B as a fan-out FOV overlap 131. The fan-out FOV overlap 131 substantially degrades the performance of the optoelectronic module 101 since some emitted light 119 is directly incident on the detector 105 (i.e., via the fan-out FOV overlap 131). According to the present disclosure, various implementations described below can be operable to reduce or eliminate the fan-out FOV overlap 131 while also concealing or minimizing the visual impact of an optoelectronic module mounted within a host device. In other words, the techniques and apparatuses are designed to limit the visual distinction of an optoelectronic module in comparison to the surrounding portions of the host device while maintain reasonable optical performance.

Figure 2:
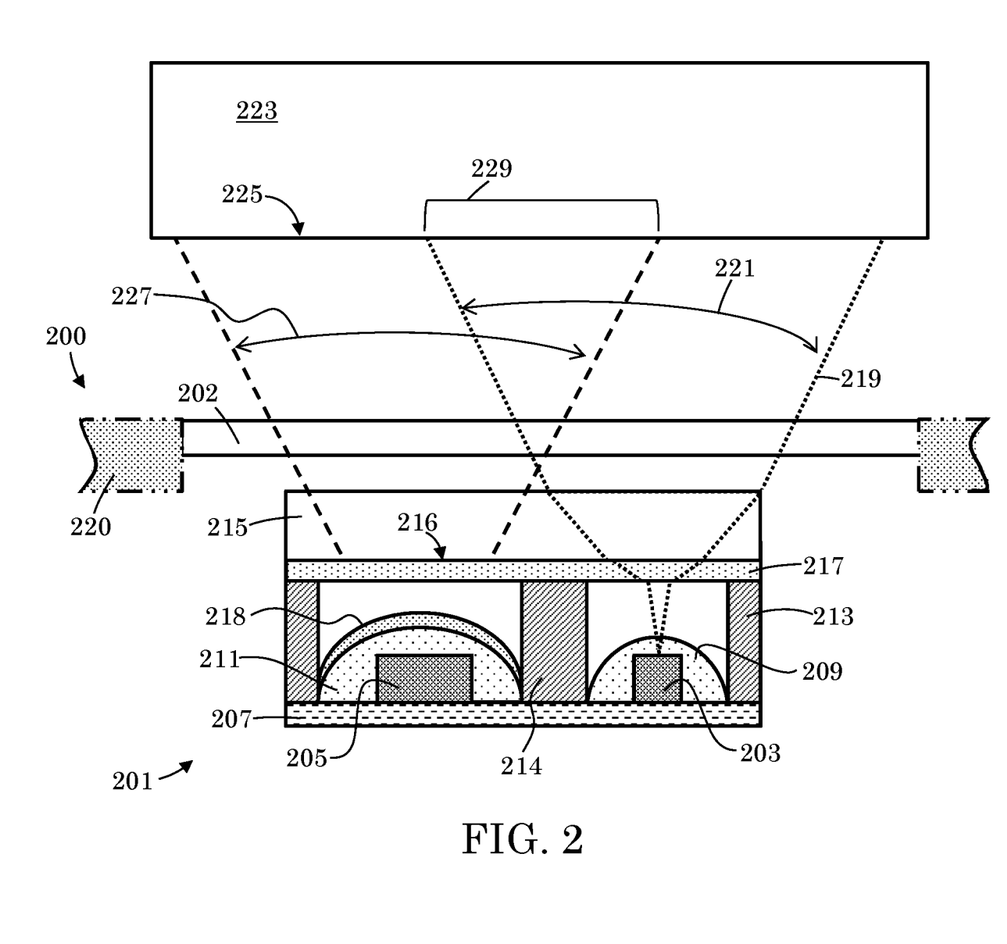
FIG. 2 depicts an example optoelectronic host device in which an example optoelectronic module is mounted, wherein the module has limited visual distinction in comparison to the surrounding portions of the host device.

FIG. 2 depicts an example optoelectronic host device in which an example optoelectronic module is mounted, wherein the module has limited visual distinction in comparison to the surrounding portions of the host device. The optoelectronic module 201 is mounted within a host device 200 under a host device transparent cover 202. The optoelectronic module 201 can include an emitter 203, a detector 205, a substrate 207, an emitter optical element 209, a detector optical element 211, a spacer 213, an optoelectronic module cover 215. The optoelectronic module cover 215 includes an optoelectronic module cover surface 216. Further, the optoelectronic module 201 includes spectral filters 218. The aforementioned components are operable as in the example optoelectronic module depicted in FIG. 1B. Further, various components can be included or need not be included depending on the implementation, as described previously. In the present example, depicted in FIG. 2, the optoelectronic module cover 215 is substantially transmissive to wavelengths of light in the invisible and visible portion of the electromagnetic spectrum. Moreover, the optoelectronic module 201 further includes a reflectance member 217 functionally disposed on the optoelectronic module cover surface 216. The reflectance member 217 can be a polymeric coating in some implementations, and can be spin-coated onto the optoelectronic module surface 216. In this example, the reflectance member 217 is diffusively reflective such that it appears a particular color (e.g., white or near-white) to an observer. Consequently, the optoelectronic module 201, appears to be the same particular color (e.g., white or near-white) to an observer of the host device 200. Accordingly, the optoelectronic module 201 can be concealed or its visual impact minimized in comparison to surrounding portions of the host device 200.

In addition, the reflectance member 217 has certain reflectance characteristics such that it may be partially transmissive to invisible portions of the electromagnetic spectrum such as the emitted light 219. However, a fan-out FOV overlap, such as the fan-out FOV overlap 131 illustrated in FIG. 1B is avoided. The thickness, and transmissive and diffusive properties of the reflectance member 217, are selected to substantially mitigate or eliminate a fan-out overlap in the example implementation depicted in FIG. 2 thereby permitting reasonable optical performance of the optoelectronic module 201. In some implementations, the reflectance member 217 can be configured to be spectrally reflective (e.g., a mirror like surface) with metallic coatings (such as a coating of aluminum). For example, in implementations where the reflectance member 217 is configured to be spectrally reflective and the host device outer cover appears white, the optoelectronic module 201 can be sufficiently concealed while permitting optimal functionality as described above.

Figure 3:
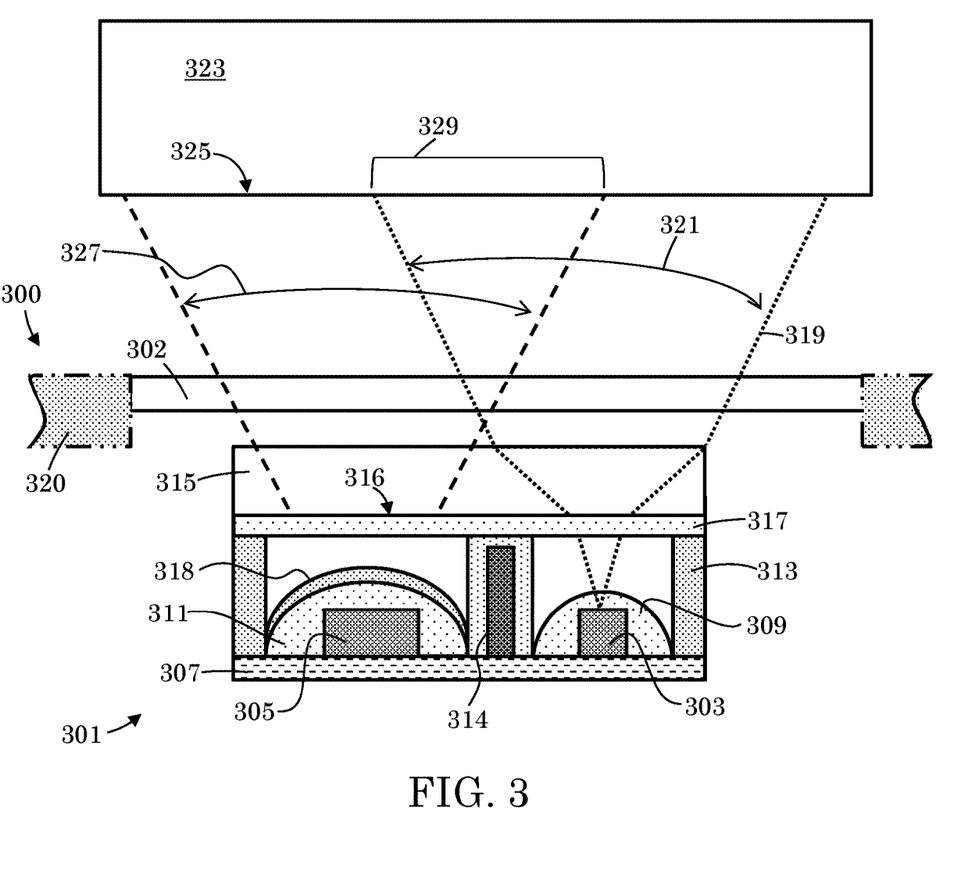
FIG. 3 depicts another example optoelectronic host device in which an example optoelectronic module is mounted, wherein the module has limited visual distinction in comparison to the surrounding portions of the host device.

FIG. 3 depicts another example optoelectronic host device in which an example optoelectronic module is mounted, wherein the module has limited visual distinction in comparison to the surrounding portions of the host device. The optoelectronic module 301 is mounted within a host device 300 under a host device transparent cover 302. The optoelectronic module 301 can include an emitter 303, a detector 305, a substrate 307, an emitter optical element 309, a detector optical element 311, a spacer 313, and an optoelectronic module cover 315. The optoelectronic module cover 315 includes an optoelectronic module cover surface 316 and can further include a reflectance member 317. Further, the optoelectronic module 301 can include spectral filters 318. The aforementioned components are operable as in the example implementation depicted in FIG. 2. Further, various components can be included or need not be included depending on the implementation as described previously.

The spacer 313 can be composed of a material with similar reflectance properties as the reflectance member 317 and the host device 300. To observer, the spacer 313 can appear to be the same particular color (e.g., white or near-white) as the reflectance member 317 and the host device case 320. However, the spacer 313 may also be partially transmissive to the emitted light 319. Accordingly, the optoelectronic module 301 can further include a non-transmissive spacer core 314. The non-transmissive spacer core 314 can be composed of a polymeric material, a resin or other suitable material (e.g., materials that permit the non-transmissive spacer core to be manufactured via molding, injection molding, and/or vacuum injection molding techniques) configured to substantially block or attenuate wavelengths of light corresponding to the emitted light 319. The spacer 313 can also be composed of a polymeric material, a resin or other suitable material (e.g., materials that permit the spacer to be manufactured via molding, injection molding, and/or vacuum injection molding techniques), and can include inorganic filler such as $TiO_2$ or other suitable material that would give spacer 313 the appearance of a particular color (e.g., white or near white).

As in the example implementation illustrated in FIG. 2, the thickness and reflectance characteristics of the reflectance member 317 can be selected to mitigate or eliminate a fan-out FOV overlap. However, the non-transmissive spacer core 314 and the spacer 313 may also influence the thickness and reflectance characteristics of the reflectance member 317. For example, the thickness of reflectance member 317 must be selected to both: 1) mitigate or eliminate a fan-out FOV overlap, and 2) to appear white to an observer. To appear white to an observer, the reflectance member 317 must adequately conceal the components of the optoelectronic module 301 over which the reflectance member 317 is disposed, such as the spacer 313. As the spacer 313 is substantially the same color as the reflectance member 317 in this example, a thinner reflectance member 317 may be selected thereby additionally mitigating a potential fan-out FOV overlap enabling both reasonable optical performance and concealment or minimized visual impact of the optoelectronic module 301.

Figure 4:
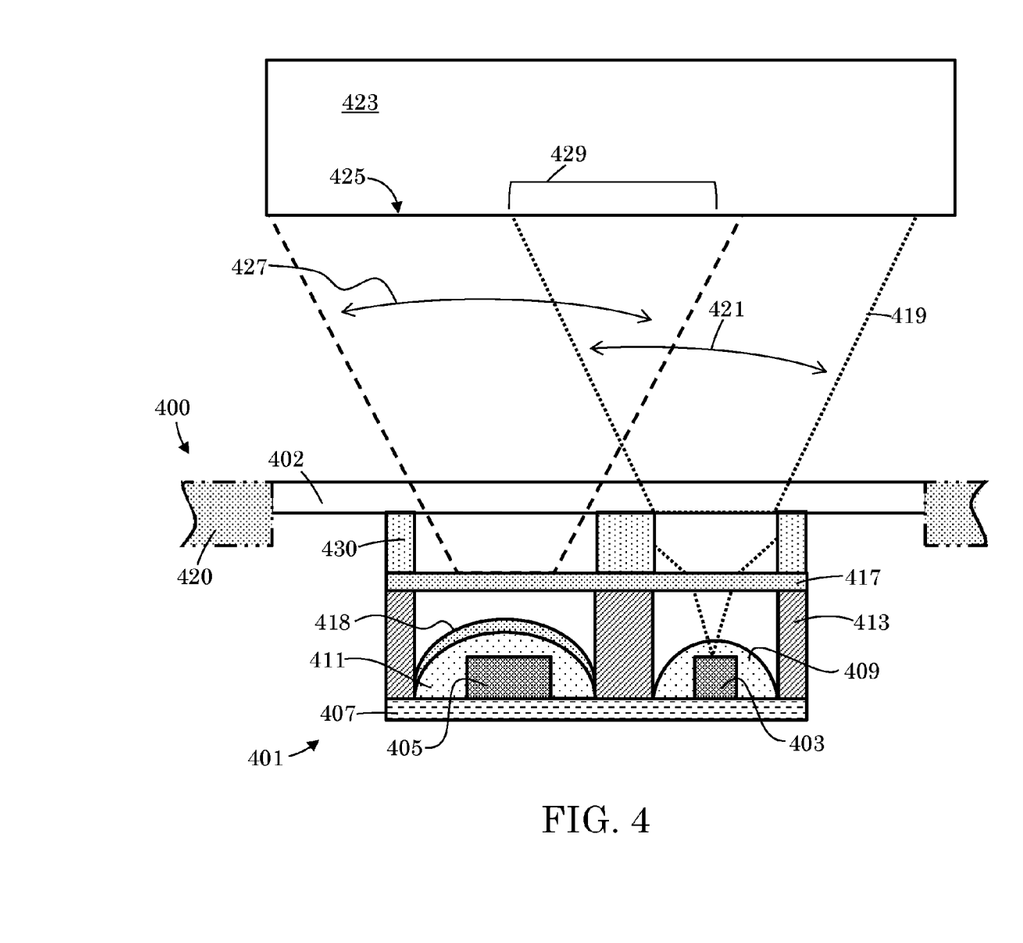
FIG. 4 depicts yet another example optoelectronic host device in which an example optoelectronic module is mounted, wherein the module has limited visual distinction in comparison to the surrounding portions of the host device.

FIG. 4 depicts yet another example optoelectronic host device in which an example optoelectronic module is mounted, wherein the module has limited visual distinction in comparison to the surrounding portions of the host device. The optoelectronic module 401 is mounted within a host device 400 under a host device transparent cover 402. The optoelectronic module 401 can include an emitter 403, a detector 405, a substrate 407, an emitter optical element 409, a detector optical element 411, a spacer 413, an optoelectronic module cover 415. The optoelectronic module cover 415 includes an optoelectronic module cover surface 416. Further, the optoelectronic module 401 includes spectral filters 418. The aforementioned components are operable as in the example implementations depicted in FIG. 1, FIG. 2, and FIG. 3. Further, various components can be included or need not be included depending on the implementation as described previously. The optoelectronic module 401 further includes a baffle 430. The baffle can be composed of a polymeric material, a resin or other suitable material (e.g., materials that permit the non-transmissive spacer core to be manufactured via molding, injection molding, and/or vacuum injection molding techniques). Further, in some implementations, the spacer can be composed of a material configured to substantially block or attenuate wavelengths of light corresponding to the emitted light 419. In the example implementation depicted in FIG. 4, the baffle 430 can be composed of a material configured to have substantially similar reflectance characteristics as the host device 400 and/or the reflectance member 417 and/or the spacer 413. For example, if the host device 400 and/or the reflectance member 417 and/or the spacer 413 have reflectance characteristics such that they appear white to a human (e.g., an observer of the host device 400) then the baffle 430 can also be configured to have similar reflectance characteristics. In such an instance, the baffle 430 can include inorganic filler such as $TiO_2$ or other suitable material that would give the baffle 430 a white appearance. Further, the baffle can substantially block stray light in some implementations. The baffle 430 can further provide for an optimal separation between the optoelectronic module 401 and the host device transparent cover 402. For example, in some implementations, the optoelectronic module 401 can be mounted to the host device transparent cover 402 or the host device 400 via the baffle 430.

Figure 5:
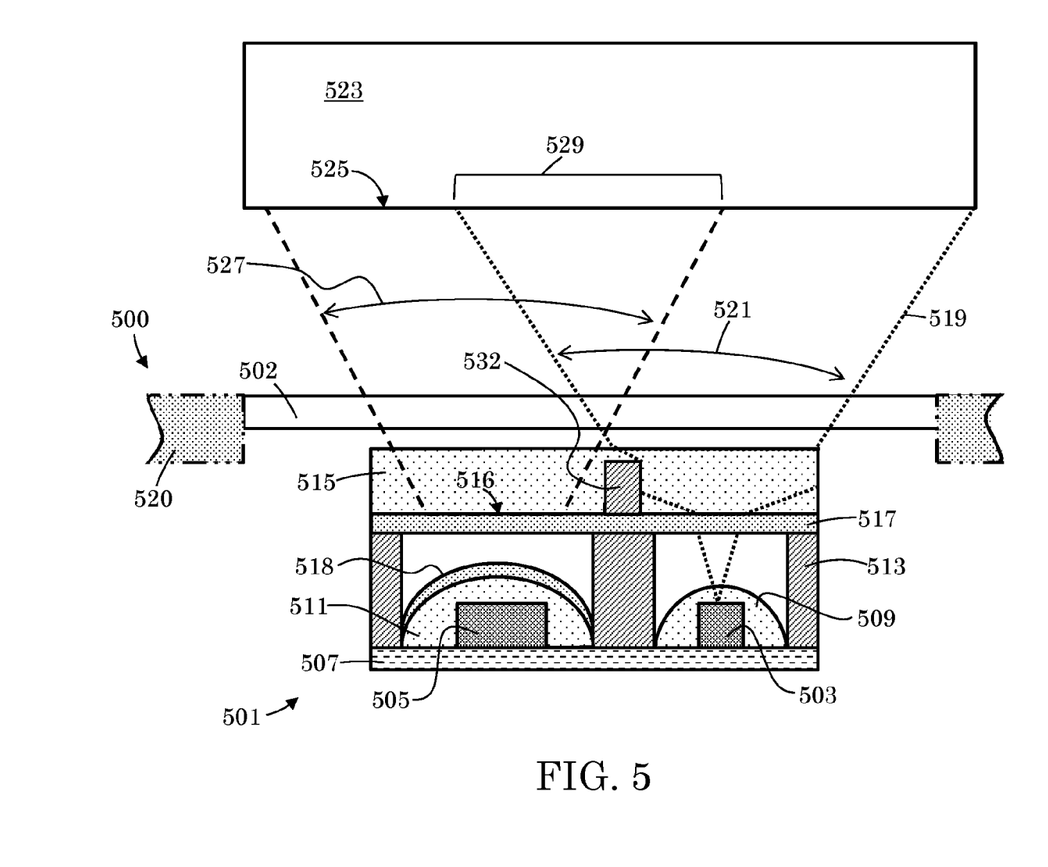
FIG. 5 depicts still yet another example optoelectronic host device in which an example optoelectronic module is mounted, wherein the module has limited visual distinction in comparison to the surrounding portions of the host device.

FIG. 5 depicts still yet another example optoelectronic host device in which an example optoelectronic module is mounted, wherein the module has limited visual distinction in comparison to the surrounding portions of the host device. The optoelectronic module 501 is mounted within a host device 500 under a host device transparent cover 502. The optoelectronic module 501 can include an emitter 503, a detector 505, a substrate 507, an emitter optical element 509, a detector optical element 511, a spacer 513, an optoelectronic module cover 515. The optoelectronic module cover 515 includes an optoelectronic module cover surface 516. Further, the optoelectronic module 501 includes spectral filters 518. The aforementioned components are operable as in the example implementation depicted in FIG. 1-FIG. 4. Further, various components can be included or need not be included depending on the implementations.

In this implementation the optoelectronic module cover 515 is partially reflective to wavelengths of light within the visible portion of the electromagnetic spectrum, as described previously, such as the example optoelectronic module illustrated in FIG. 1. Consequently, the optoelectronic module cover 515 can be substantially diffusive to the emitted light 519 generated by the emitter 503. Accordingly, a fan-out FOV overlap could result, however, the optoelectronic module 501 further includes a non-transmissive cover core 532 designed to mitigate a potential fan-out FOV overlap. The non-transmissive cover core 532 can be imbedded in the reflectance member 517 between the emitter 503 and the detector 505. The non-transmissive cover core 532 can be composed of a polymeric material, a resin or other suitable material (e.g., materials that permit the spacer to be manufactured via molding, injection molding, and/or vacuum injection molding techniques). Further, the non-transmissive cover core 532 can be composed of a material configured to substantially block or attenuate wavelengths of light corresponding to the emitted light 519. For example, the non-transmissive cover core 532 can be composed of a material with organic fillers (e.g., carbon black) and/or inorganic fillers (e.g., silica). The non-transmissive cover core 532 can be configured such that the emitted light 519 does not form a fan-out FOV overlap 131 as depicted in FIG. 1B. Accordingly, the non-transmissive cover core 532 can permit optimal functionality of the optoelectronic module 501 while being substantially concealed e.g., form an observer of the host device 500.

Figure 6A:
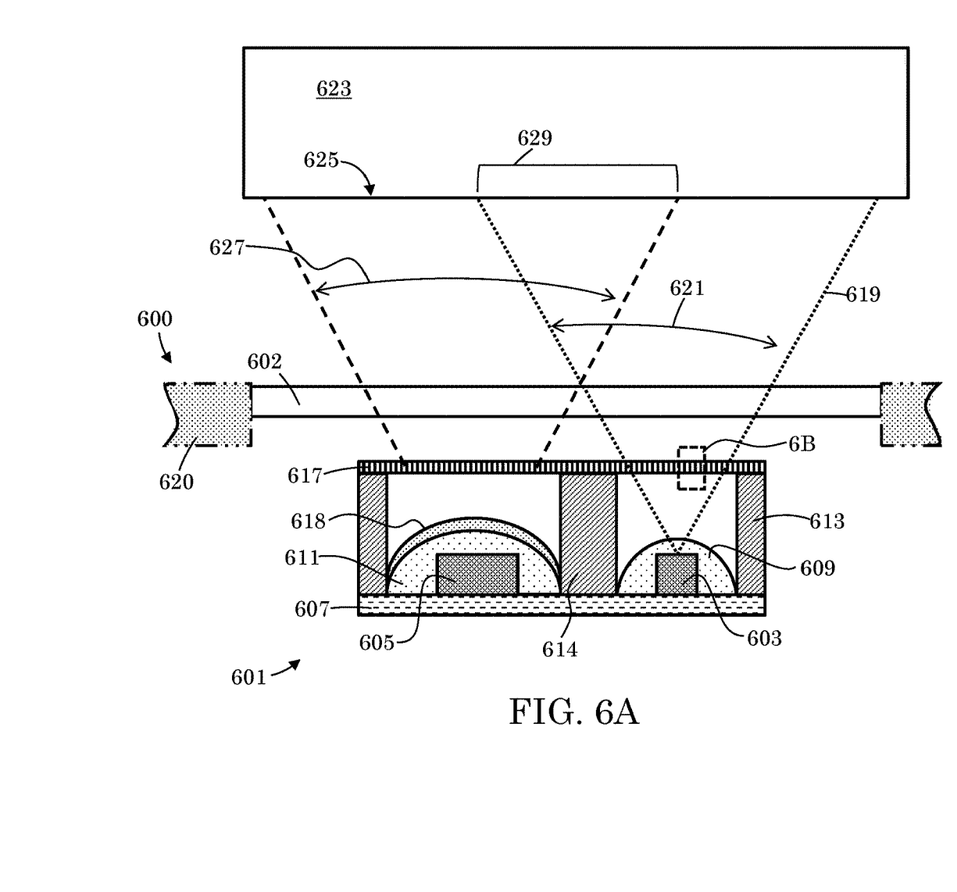
FIG. 6A depicts even still yet another example optoelectronic host device in which an example optoelectronic module is mounted, wherein the module has limited visual distinction in comparison to the surrounding portions of the host device.

FIG. 6A depicts even still yet another example optoelectronic host device in which an example optoelectronic module is mounted, wherein the module has limited visual distinction in comparison to the surrounding portions of the host device. The optoelectronic module 601 is mounted within a host device 600 under a host device transparent cover 602. The optoelectronic module 601 can include an emitter 603, a detector 605, a substrate 607, an emitter optical element 609, a detector optical element 611, a spacer 613, an optoelectronic module cover 615. The optoelectronic module cover 615 includes an optoelectronic module cover surface 616. Further, the optoelectronic module 601 includes spectral filters 618. The aforementioned components are operable as in the example implementations described previously. However, the reflectance member 617 includes holes 633 for permitting the transmission of the emitted light 619. The holes 633 can be from 20 to 100 microns in some implementations, and with a fill factor across the reflectance member 617 of 30%-50%, for example. The reflectance member 617 can be partially reflective to wavelengths of light within the visible portion of the electromagnetic spectrum such that its reflectance characteristics, its appearance is similar to an outer cover of the host device 600. Further the size and placement of the holes 633 can be configured such that the appearance of the optoelectronic module 601 is similar to the outer cover of the host device 600.

Figure 6B:
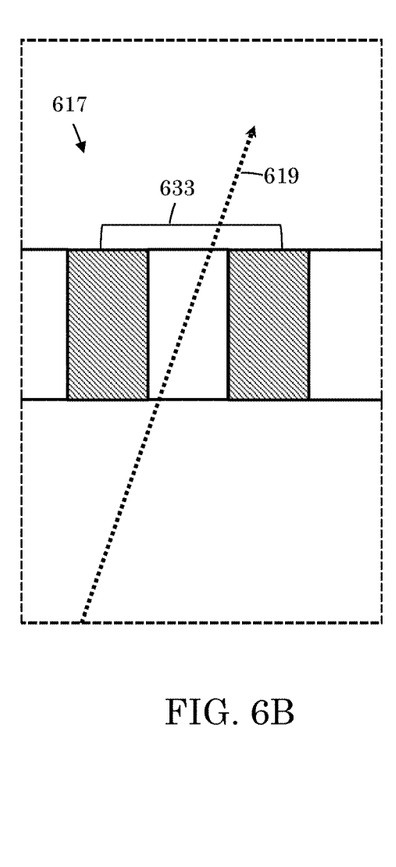
FIGS. 6B-6D depict magnified views of components of the optoelectronic module depicted in FIG. 6A.
Figure 6C:
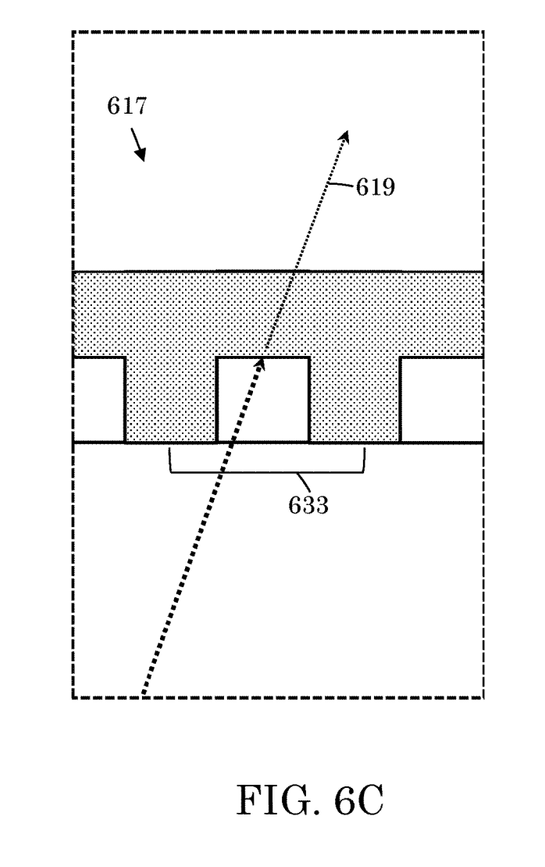

A magnified view of a portion of the reflectance member 617 is depicted in FIG. 6B. The holes depicted in FIG. 6B are throughholes. The throughholes permit emitted light 619 to pass un-attenuated. However, other types of holes can be employed in some implementations. For example, the holes 633 need not be implemented as throughholes as depicted in FIG. 6C. Sufficient emitted light 619 can be pass through the reflectance member 617 to ensure good functionality of the optoelectronic module 601, while the reflectance characteristics (the appearance) of the reflectance member 617 is sufficiently similar to a host device outer cover 600 so that the optoelectronic module 601 is sufficiently concealed to e.g., an observer of the host device.

Figure 6D:
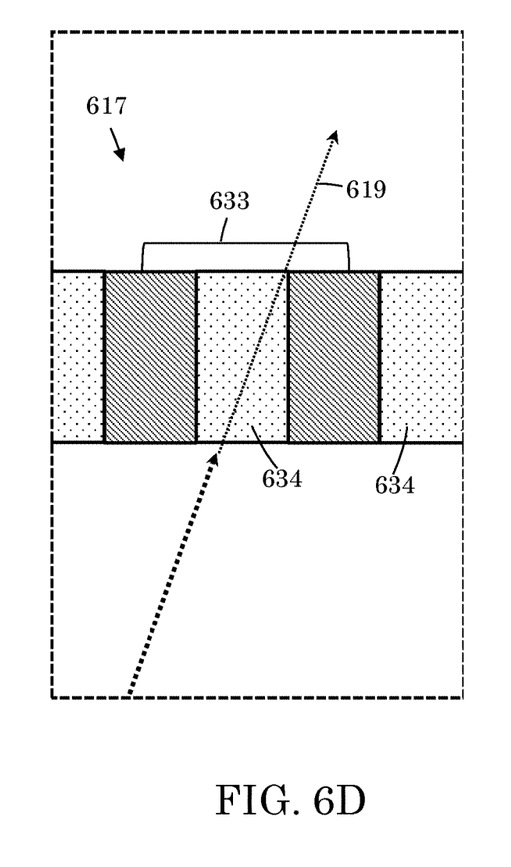

Another implementation is depicted in FIG. 6D. The holes 633 can be filled or partially filled with a hole filler material 634. The hole filler material 634 can be configured such that its reflectance characteristics are similar to the reflectance characteristics of the reflectance member 617. For example, if the outer cover of the host device 600 appears white, the hole filler material 634 can include a polymeric material with an inorganic filler (such as $TiO_2$) or a dye configured such that the reflectance member 617 appears white.

Figure 7:
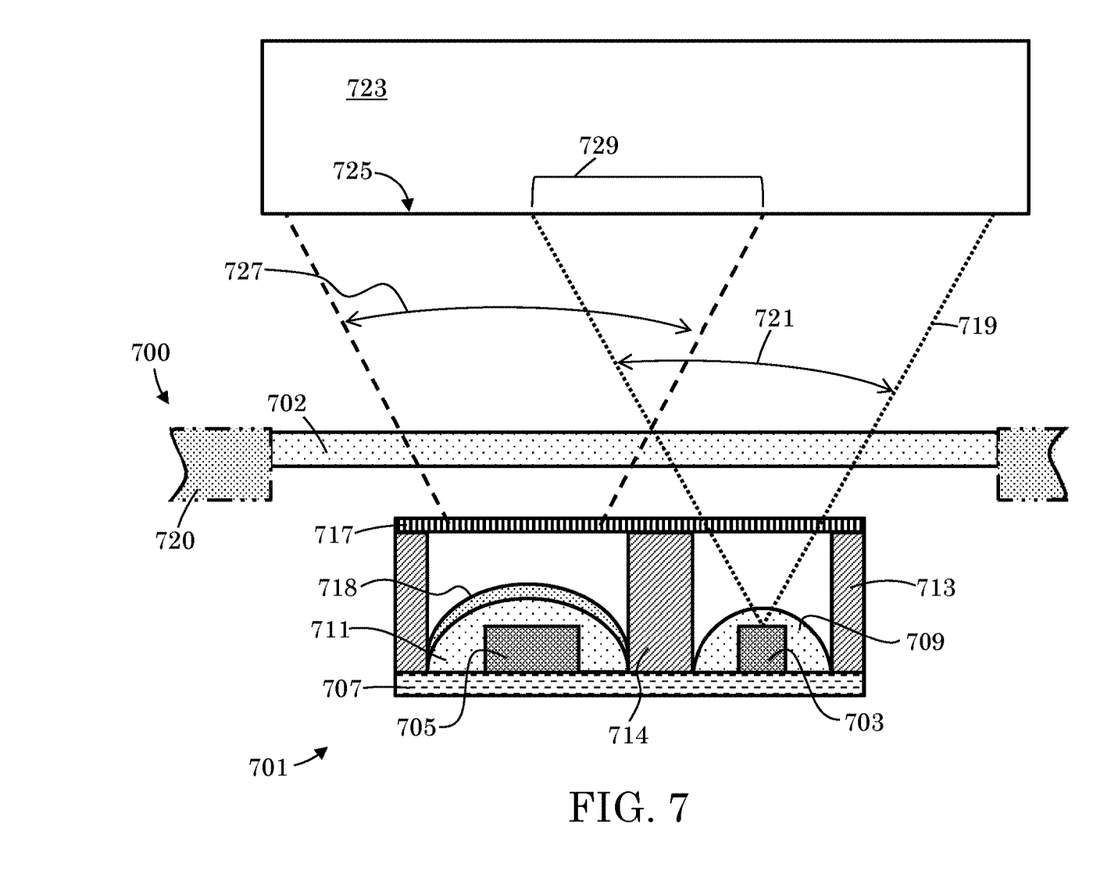
FIG. 7 depicts even still yet another example optoelectronic host device in which an example optoelectronic module is mounted, wherein the module has limited visual distinction in comparison to the surrounding portions of the host device.

FIG. 7 depicts even still yet another example optoelectronic host device in which an example optoelectronic module is mounted, wherein the module has limited visual distinction in comparison to the surrounding portions of the host device. The optoelectronic module 701 is mounted within a host device 700 under a host device transparent cover 702. The optoelectronic module 701 can include an emitter 703, a detector 705, a substrate 707, an emitter optical element 709, a detector optical element 711, a spacer 713, an optoelectronic module cover 715. The optoelectronic module cover 715 includes an optoelectronic module cover surface 716. The optoelectronic module 701 further includes spectral filters 718. The aforementioned components are operable as in the example implementations described above. However, the host device cover 702 can have reflectance characteristics such that, together with the optoelectronic module 701, its reflectance characteristics, its appearance is similar to an outer cover of the host device 700. As in the previous examples described above, the optoelectronic module 701 would be substantially concealed or its visual impact minimized to an observer of the host device 700.

Figure 8:
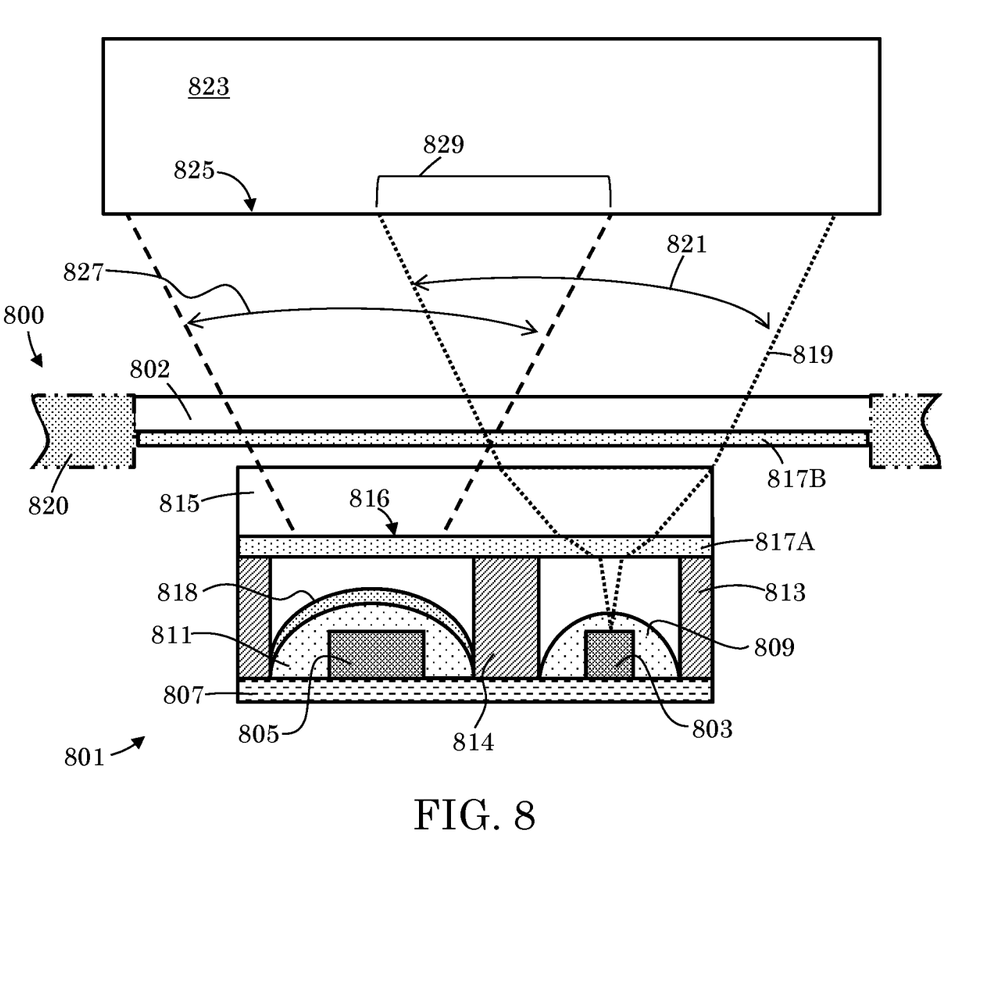
FIG. 8 depicts even still yet another example optoelectronic host device in which an example optoelectronic module is mounted, wherein the module has limited visual distinction in comparison to the surrounding portions of the host device.

FIG. 8 depicts even still yet another example optoelectronic host device in which an example optoelectronic module is mounted, wherein the module has limited visual distinction in comparison to the surrounding portions of the host device. The optoelectronic module 801 is mounted within a host device 800 under a host device transparent cover 802. The optoelectronic module 801 can include an emitter 803, a detector 805, a substrate 807, an emitter optical element 809, a detector optical element 811, a spacer 813, and an optoelectronic module cover 815. The optoelectronic module cover 815 includes an optoelectronic module cover surface 816. Further, the optoelectronic module 801 includes spectral filters 818. The aforementioned components are operable as in the example optoelectronic modules depicted above, for example in FIG. 1 and FIG. 2. Further, various components can be included or need not be included depending on the implementation, as described previously. In the present example, depicted in FIG. 8, the optoelectronic module cover 815 is substantially transmissive to wavelengths of light in the invisible and visible portion of the electromagnetic spectrum. Moreover, the optoelectronic module 801 further includes a reflectance member 817A functionally disposed on the optoelectronic module cover surface 816.

In this example, the reflectance member 817A is diffusively reflective such that it appears a particular color (e.g., white or near-white) to an observer. Further, the host device 800 include a reflectance member host device reflectance member 817B functionally disposed on the surface of the host device transparent cover 802. Consequently, the optoelectronic module 801, appears to be the same particular color (e.g., white or near-white) to an observer of the host device 800. Accordingly, the optoelectronic module 801 can be concealed or its visual impact minimized in comparison to surrounding portions of the host device 800.

As in the example implementation illustrated in FIG. 2, the thickness and reflectance characteristics of the reflectance member 817A can be selected to mitigate or eliminate a fan-out FOV overlap. However, the host device reflectance member 817B may also influence the thickness and reflectance characteristics of the reflectance member 817A. For example, as described above, the thickness of reflectance member 817A must be selected to both: 1) mitigate or eliminate a fan-out FOV overlap, and 2) to appear white to an observer. To appear white to an observer, the reflectance member 817A must adequately conceal the components of the optoelectronic module 801 over which the reflectance member 817A is disposed. As the reflectance member host device reflectance member 817B can have similar reflectance properties as the reflectance member 817A, and the reflectance properties influencing their appearance may be cumulative, a thinner reflectance member 817A may be selected thereby additionally mitigating a potential fan-out FOV overlap enabling both reasonable optical performance and concealment or minimized visual impact of the optoelectronic module 801.

In addition, as described in previous implementations, the reflectance members 817A and host device reflectance member 817B have certain reflectance characteristics such that they may be partially transmissive to invisible portions of the electromagnetic spectrum such as the emitted light 819. However, a fan-out FOV overlap, such as the fan-out FOV overlap 131 illustrated in FIG. 1B is avoided in both reflectance members 817A and host device reflectance member 817B. The thickness, and transmissive and diffusive properties of the reflectance members 817A and host device reflectance member 817B, are selected to substantially mitigate or eliminate a fan-out overlap as in the example implementation depicted in FIG. 1 thereby permitting reasonable optical performance of the optoelectronic module 801. In some case, having both reflectance members 817A and host device reflectance member 817B.

In some implementations, the reflectance members 817A and host device reflectance member 817B can be configured to be spectrally reflective (e.g., a mirror like surface) with metallic coatings (such as a coating of aluminum). For example, in implementations where the reflectance members 817A and host device reflectance member 817B are configured to be spectrally reflective and the host device outer cover appears white, the optoelectronic module 801 can be sufficiently concealed while permitting optimal functionality as described above.

Various modifications can be made to the foregoing implementations, and features described in different implementations can, in some cases, be combined in the same implementations. Accordingly, other implementations are within the scope of the claims.

What is claimed, is:

1. An optoelectronic module comprising:
    an emitter and a detector electrically mounted to a substrate, the emitter being operable to generate emitted light of a particular wavelength or range of wavelengths, and the detector being operable to detect the particular wavelength or range of wavelengths generated by the emitter;
    a spacer disposed between the emitter and the detector;
    an optoelectronic module cover including an optoelectronic module cover surface, the optoelectronic module cover being substantially transmissive to the emitted light; and
    a reflectance member including a plurality of holes filled with a filler material, the reflectance member being mounted to the optoelectronic module cover surface, the reflectance member being both transmissive and diffusively reflective to the particular wavelengths or ranges of wavelengths generated by the emitter and detectable by the detector such that the optoelectronic module exhibits substantially no fan-out field-of-view overlap, wherein the filler material is transmissive and diffusively reflective to a particular wavelength or ranges of wavelengths different from the reflectance member.

2. The optoelectronic module according to claim 1, in which the optoelectronic module further includes a baffle mounted to the optoelectronic module cover or spectral reflectance member.

3. The optoelectronic module according to claim 2 wherein the baffle is substantially non-transmissive to the particular wavelength or range of wavelengths of light generated by the emitter and detectable by the detector.

4. The optoelectronic module of claim 1, wherein the spacer is substantially non-transmissive to the particular wavelength or range of wavelengths of light generated by the emitter and detectable by the detector.

5. The optoelectronic module according to claim 4, in which the optoelectronic module further includes a baffle mounted to the optoelectronic module cover or spectral reflectance member.

6. The optoelectronic module according to claim 5 wherein the baffle is substantially non-transmissive to the particular wavelength or range of wavelengths of light generated by the emitter and detectable by the detector.

7. The optoelectronic module of claim 1, the spacer further comprising a non-transmissive core wherein the non-transmissive core is substantially non-transmissive to the particular wavelength or range of wavelengths of light generated by the emitter and detectable by the detector.

8. The optoelectronic module according to claim 7, in which the optoelectronic module further includes a baffle mounted to the optoelectronic module cover or spectral reflectance member.

9. The optoelectronic module according to claim 8 wherein the baffle is substantially non-transmissive to the particular wavelength or range of wavelengths of light generated by the emitter and detectable by the detector.

10. The optoelectronic module according to claim 1, the optoelectronic module cover including a non-transmissive cover core wherein the non-transmissive cover core is substantially non-transmissive to the particular wavelength or range of wavelengths of light generated by the emitter and detectable by the detector.

11. The optoelectronic module according to claim 1, wherein the plurality of holes extends over 30% to 50% of the reflectance member surface.

12. The optoelectronic module according to claim 1, wherein the holes are through holes.

13. The optoelectronic module according to claim 1, wherein the optoelectronic module is mounted into a host device, the host device including a host device case wherein the host device case is diffusively reflective to the same particular wavelength or range of wavelengths as the reflectance member.

14. The optoelectronic module of claim 13, wherein the spacer is diffusively reflective to the same particular wavelength or range of wavelengths as the host device.

15. The optoelectronic module of claim 14, wherein the spacer includes a non-transmissive spacer core, wherein the non-transmissive spacer core is substantially non-transmissive to the particular wavelength or range of wavelengths of light generated by the emitter and detectable by the detector.

16. The optoelectronic module of claim 13, wherein a baffle is mounted to the optoelectronic module cover or spectral reflectance member, wherein the baffle is substantially non-transmissive to the particular wavelength or range of wavelengths of light generated by the emitter and detectable by the detector, and wherein the baffle is diffusively reflective to the same particular wavelength or range of wavelengths as the host device.

17. The optoelectronic module of claim 13, wherein the optoelectronic module cover includes a non-transmissive cover core wherein the non-transmissive cover core is substantially non-transmissive to the particular wavelength or range of wavelengths of light generated by the emitter and detectable by the detector, and wherein the non-transmissive cover core is diffusively reflective to the same particular wavelength or range of wavelengths as the host device.

18. The optoelectronic module of claim 13, wherein the reflectance member includes a plurality of holes, the portion of the reflectance member surrounding each hole within the plurality being diffusively reflective to the same particular wavelength or range of wavelengths as the host device.

19. The optoelectronic module according to claim 1, wherein the optoelectronic module is mounted into a host device, the host device including a host device case wherein the host device case is diffusively reflective to the same particular wavelength or range of wavelengths as the reflectance member, the host device further including a host device transparent cover, the host device transparent cover being both transmissive and diffusively reflective to the particular wavelengths or ranges of wavelengths generated by the emitter and detectable by the detector, and the host device transparent cover being diffusively reflective to the same particular wavelengths as the host device.

20. An optoelectronic module comprising:
an emitter and a detector electrically mounted to a substrate, the emitter being operable to generate emitted light of a particular wavelength or range of wavelengths, and the detector being operable to detect the particular wavelength or range of wavelengths generated by the emitter;
a spacer disposed between the emitter and the detector;
an optoelectronic module cover including an optoelectronic module cover surface, the optoelectronic module cover being substantially transmissive to the emitted light; and
a reflectance member being mounted to the optoelectronic module cover surface, the reflectance member being both transmissive and diffusively reflective to the particular wavelengths or ranges of wavelengths generated by the emitter and detectable by the detector such that the optoelectronic module exhibits substantially no fan-out field-of-view overlap, wherein the reflectance member includes a plurality of holes and wherein the average diameter of an individual hole among the plurality of holes is between 20 microns and 100 microns.

21. An optoelectronic module comprising:
an emitter and a detector electrically mounted to a substrate, the emitter being operable to generate emitted light of a particular wavelength or range of wavelengths, and the detector being operable to detect the particular wavelength or range of wavelengths generated by the emitter;
a spacer disposed between the emitter and the detector;

an optoelectronic module cover including an optoelectronic module cover surface, the optoelectronic module cover being substantially transmissive to the emitted light; and a reflectance member including a plurality of holes filled with a filler material, the reflectance member being mounted to the optoelectronic module cover surface, the reflectance member being both transmissive and diffusively reflective to the particular wavelengths or ranges of wavelengths generated by the emitter and detectable by the detector such that the optoelectronic module exhibits substantially no fan-out field-of-view overlap, wherein the plurality of holes extends over 40% of the reflectance member surface, and the average diameter of an individual hole among the plurality of holes is 40 microns.

22. An optoelectronic module comprising:

an emitter and a detector electrically mounted to a substrate, the emitter being operable to generate emitted light of a particular wavelength or range of wavelengths, and the detector being operable to detect the particular wavelength or range of wavelengths generated by the emitter;

a spacer disposed between the emitter and the detector;

an optoelectronic module cover including an optoelectronic module cover surface, the optoelectronic module cover being substantially transmissive to the emitted light; and a reflectance member being mounted to the optoelectronic module cover surface, the reflectance member being both transmissive and diffusively reflective to the particular wavelengths or ranges of wavelengths generated by the emitter and detectable by the detector such that the optoelectronic module exhibits substantially no fan-out field-of-view overlap, wherein the optoelectronic module is mounted into a host device, the host device including a host device case wherein the host device case is diffusively reflective to the same particular wavelength or range of wavelengths as the reflectance member, the host device further including a host device transparent cover and a host device reflectance member mounted to the host device transparent cover, wherein the host device reflectance member is transmissive to the particular wavelengths or ranges of wavelengths generated by the emitter and detectable by the detector, and the host device reflectance member is diffusively reflective to the same particular wavelengths as the host device.

* * * * *